United States Patent
Nishiumi

(10) Patent No.: US 7,600,372 B2
(45) Date of Patent: Oct. 13, 2009

(54) EXHAUST GAS CONTROL APPARATUS FOR INTERNAL COMBUSTION ENGINE

(75) Inventor: Ryoji Nishiumi, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 572 days.

(21) Appl. No.: 11/579,982

(22) PCT Filed: Jun. 23, 2005

(86) PCT No.: PCT/IB2005/001783

§ 371 (c)(1), (2), (4) Date: Nov. 9, 2006

(87) PCT Pub. No.: WO2006/000893

PCT Pub. Date: Jan. 5, 2006

(65) Prior Publication Data

US 2007/0220866 A1  Sep. 27, 2007

(30) Foreign Application Priority Data

Jun. 24, 2004 (JP) .............................. 2004-186794

(51) Int. Cl.
*F01N 3/00* (2006.01)
(52) U.S. Cl. ....................... 60/286; 60/280; 60/287; 60/288; 60/295; 60/303; 60/600; 60/605.1
(58) Field of Classification Search ............... 60/280, 60/286, 287, 288, 295, 297, 303, 311, 600, 60/605.1
See application file for complete search history.

(56) References Cited

U.S. PATENT DOCUMENTS

| 5,673,559 | A | 10/1997 | Benson |
| 6,438,948 | B2* | 8/2002 | Ono et al. ..................... 60/311 |
| 6,574,961 | B2* | 6/2003 | Shiraishi et al. ............... 60/602 |
| 6,851,256 | B2* | 2/2005 | Chamoto et al. .............. 60/280 |
| 6,874,315 | B2* | 4/2005 | Nakatani et al. .............. 60/285 |
| 7,191,589 | B2* | 3/2007 | Yasui et al. ................... 60/284 |

FOREIGN PATENT DOCUMENTS

| DE | 31 25 305 A1 | 1/1983 |
| DE | 39 09 932 A1 | 9/1990 |
| DE | 41 39 291 A1 | 6/1993 |
| JP | A 2003-206722 | 7/2003 |
| WO | WO 01/73271 A1 | 10/2001 |
| WO | WO 01/73273 A1 | 10/2001 |

OTHER PUBLICATIONS

Journal of technical Disclosure published by Japanese Institute of Invention, Innovation No. 03-503795, Jun. 30, 2003.

* cited by examiner

*Primary Examiner*—Binh Q Tran
(74) *Attorney, Agent, or Firm*—Oliff & Berridge, PLC

(57) ABSTRACT

A bypass passage is provided, which connects a portion upstream of a turbine of a supercharger in an exhaust passage to a portion close to a front end surface of exhaust gas purification in the exhaust passage, and through which at least part of exhaust gas discharged from an internal combustion engine flows. The exhaust gas discharged from the bypass passage is blown to the front end surface of the exhaust gas purification means in a lateral direction of the front end surface, whereby particulate matter deposited in the front end surface of the exhaust gas purification means is blown off.

7 Claims, 8 Drawing Sheets

EXHAUST GAS CONTROL APPARATUS FOR INTERNAL COMBUSTION ENGINE

INCORPORATION BY REFERENCE

The disclosure of Japanese Patent Application No. 2004-186794 filed on Jun. 24, 2004, including the specification, drawings and abstract is incorporated herein by reference in its entirety.

BACKGROUND OF THE INVENTION

1. Field of the Invention

The invention relates to an exhaust gas control apparatus for an internal combustion engine. More particularly, the invention relates to an exhaust gas control apparatus for an internal combustion engine, which includes exhaust gas purification means that has oxidizing ability, and that is provided in an exhaust passage.

2. Description of the Related Art

International Application Published under the Patent Cooperation Treaty No. 01/073273 discloses a technology relating to an exhaust system of an internal combustion engine, in which a particulate filter (hereinafter, referred to as "filter") for capturing particulate matter (hereinafter, referred to as "PM") in exhaust gas is provided in an exhaust passage. In this technology, an exhaust throttle valve that is provided in the exhaust passage at a portion downstream of the filter is fully opened, and then is closed at given time intervals, whereby the PM with which the filter is clogged is removed.

Also, International Application Published under the Patent Cooperation Treaty No. 01/073271 discloses a technology relating to an exhaust system of an internal combustion engine, in which a filter is provided in an exhaust passage. In the technology, air is blown to a front end surface of the filter in a lateral direction of the front end surface of the filter, whereby PM deposited in the front end surface of the filter is blown off. Also, Japanese Patent Application Publication No. JP(A) 2003-206722 and Journal of Technical Disclosure published by Japanese Institute of Invention and Innovation No. 03-503795 disclose related art.

In an exhaust system of an internal combustion engine, in which exhaust gas purification means having an oxidizing function such as a filter supporting an oxidation catalyst or a NOx storage reduction catalyst is provided in an exhaust passage, PM discharged from the internal combustion engine adheres to the exhaust gas purification means, and is deposited in the exhaust gas purification means.

In such an internal combustion engine, a PM removal control is performed. By performing the PM removal control, for example, fuel is supplied into the exhaust passage at a portion upstream of the exhaust gas purification means so that unburned fuel components are supplied to the exhaust gas purification means, and a temperature of the exhaust gas purification means is increased using heat of oxidation of the unburned fuel components in the exhaust gas purification means, whereby the deposited PM is oxidized and removed.

However, a temperature is unlikely to increase in an upstream end surface of the exhaust gas purification means, which is in an upstream side of the exhaust gas purification means in a direction in which the exhaust gas flows. That is, the temperature is unlikely to increase in the front end surface of the exhaust gas purification means even when the PM removal control is performed. Therefore, it may be difficult to remove the PM deposited in the front end surface even by the PM removal control.

Also, in the PM removal control, when the unburned fuel components are supplied to the exhaust passage at a portion upstream of the exhaust gas purification means so that the unburned fuel components are supplied to the exhaust gas purification means, part of the supplied unburned fuel components may adhere to the front end surface of the exhaust gas purification means. If the unburned fuel components adhere to the front end surface of the exhaust gas purification means, the unburned fuel components adhering to the front end surface and the PM in the exhaust gas are mixed together. As a result, the PM may be more likely to be deposited in the front end surface of the exhaust gas purification means.

If an amount of the PM deposited in the front end surface of the exhaust gas purification means increases to an excessive value, a pressure in the exhaust passage at a portion upstream of the exhaust gas purification means may increase to an excessive value, which may influence an operating state of the internal combustion engine.

SUMMARY OF THE INVENTION

In view of the above, it is an object of the invention to provide a technology in which, in an exhaust gas control apparatus for an internal combustion engine, which includes an exhaust gas purification device that has oxidizing ability, and that is provided in an exhaust passage, PM deposited in a front end surface of the exhaust gas purification device can be more appropriately removed.

According to the invention, a bypass passage is provided, which connects a portion upstream of a turbine of a supercharger in an exhaust passage to a portion close to a front end surface of exhaust gas purification device in the exhaust passage, and through which at least part of exhaust gas discharged from an internal combustion engine flows. The exhaust gas discharged from the bypass passage is blown to the front end surface of the exhaust gas purification device in a lateral direction of the front end surface, whereby PM deposited in the front end surface of the exhaust gas purification device is blown off.

More specifically, an aspect of the invention relates to an exhaust gas control apparatus for an internal combustion engine, which includes a supercharger whose turbine is provided in an exhaust passage for an internal combustion engine; an exhaust gas purification device which is provided in the exhaust passage at a portion downstream of the turbine, and which has an oxidizing function; and an unburned fuel component supply device for supplying an unburned fuel component to the exhaust passage at a portion upstream of the exhaust gas purification device so that the unburned fuel component is supplied to the exhaust gas purification device when a prescribed condition is satisfied. The exhaust gas control apparatus for an internal combustion engine further includes a bypass passage whose first end is connected to the exhaust passage at a portion upstream of the turbine such that exhaust gas which has flown into the bypass passage through the first end flows so as to bypass the supercharger, and whose second end is connected to the exhaust passage at a portion close to a front end surface of the exhaust gas purification device such that the exhaust gas that has flown in the bypass passage is discharged toward the front end surface of the exhaust gas purification device in a lateral direction of the front end surface; a bypass state changing device for allowing the exhaust gas to flow in the bypass passage, and prohibiting the exhaust gas from flowing in the bypass passage; and a pressure difference detecting device for detecting a pressure difference between a pressure in the exhaust passage at a portion upstream of the turbine, and a pressure in the exhaust passage at a portion which is downstream of the turbine, and which is upstream of the exhaust gas purification device. In the exhaust gas control apparatus for an internal combustion engine, when the pressure difference detected by the pressure difference detecting device is equal to or greater than a prescribed pressure difference, the bypass passage state changing device allows the exhaust gas to flow in the bypass passage so that the exhaust gas is blown to the front end surface of the exhaust gas purification device in the lateral direction of the front end surface.

In the exhaust gas control apparatus according to the aspect of the invention, when the prescribed condition is satisfied, the unburned fuel component supply device supplies the unburned fuel component to the exhaust passage at the portion upstream of the exhaust gas purification device so that the unburned fuel component is supplied to the exhaust gas purification device. Therefore, PM is likely to be deposited in the front end surface of the exhaust gas purification device.

Accordingly, when the pressure difference between the pressure in the exhaust passage at the portion upstream of the turbine and the pressure in the exhaust passage at the portion which is downstream of the turbine, and which is upstream of the exhaust gas purification device (hereinafter, referred to as "exhaust passage pressure difference") is equal to or greater than the prescribed pressure difference, part of the exhaust gas discharged from the internal combustion engine is allowed to flow in the bypass passage. At this time, owing to the exhaust passage pressure difference, the exhaust gas that has flown in the bypass passage is ejected from an opening portion at the second end of the bypass passage, that is, the opening portion close to the front end surface of the exhaust gas purification device (hereinafter, referred to as "opening portion at the second end"). Since the bypass passage is connected to the exhaust passage at the portion close to the front end surface of the exhaust gas purification device such that the exhaust gas that has flown in the bypass passage is discharged toward the front end surface of the exhaust gas purification device in the lateral direction of the front end surface. Therefore, the exhaust gas ejected from the opening portion at the second end of the bypass passage is blown to the front end surface of the exhaust gas purification device in the lateral direction of the front end surface. Hereinafter, the exhaust gas that flows in the bypass passage, and is discharged (or ejected) from the opening portion at the second end of the bypass passage will be referred to as "bypass exhaust gas". The phrase "the bypass exhaust gas is blown to the front end surface of the exhaust gas purification device in the lateral direction of the front end surface" signifies that the bypass exhaust gas is ejected and is blown to the front end surface of the exhaust gas purification device in the direction orthogonal to a direction in which the exhaust gas flows in the exhaust passage, and flows into the exhaust gas purification device.

In the aforementioned exhaust gas control apparatus, the PM deposited in the front end surface of the exhaust gas purification device can be blown off using the bypass exhaust gas blown to the front end surface of the exhaust gas purification device in the lateral direction of the front end surface. The PM that has blown off by the bypass exhaust gas flows into the exhaust gas purification device together with the exhaust gas that flows in the exhaust gas passage and then flows into the exhaust gas purification device. Then, the PM is removed in the exhaust gas purification device. Accordingly, the PM deposited in the front end surface of the exhaust gas purification device can be more appropriately removed.

Also, the PM deposited in the front end surface of the exhaust gas purification device can be blown off without separately providing a device for blowing air to the front end surface of the exhaust gas purification device in the lateral direction of the front end surface.

Examples of the exhaust gas purification device include a NOx storage reduction catalyst, an oxidation catalyst, and a filter supporting a NOx storage reduction catalyst.

Examples of the prescribed condition include a condition that, in a case where the exhaust gas purification device is a NOx storage reduction catalyst, SOx stored in the NOx storage reduction catalyst is removed, and a condition that, in a case where the exhaust gas purification device is an oxidation catalyst or a filter supporting a NOx storage reduction catalyst, the aforementioned PM removal control is performed.

Also, the prescribed pressure difference is the pressure difference which makes it possible to blow off the PM deposited in the front end surface of the exhaust gas purification device using the bypass exhaust gas. The prescribed pressure difference is set in advance.

In the invention, an opening portion at the second end of the bypass passage may be adjacent to the front end surface of the exhaust gas purification device, and the second end of the bypass passage may be connected to the exhaust passage such that the bypass passage is substantially orthogonal to the exhaust passage.

Since the second end of the bypass passage is connected to the exhaust passage in this manner, the bypass exhaust gas is blown to the front end surface of the exhaust gas purification device in the lateral direction of the front end surface, that is, in a direction substantially parallel with the front end surface. Accordingly, with the configuration, the PM deposited in the front end surface of the exhaust gas purification device can be blown off more easily.

In a case where the exhaust gas control apparatus further includes front end surface deposited PM amount detecting device for detecting a front end surface deposited PM amount that is an amount of particulate matter deposited in the front end surface of the exhaust gas purification device, when the front end surface deposited PM amount detected by the front end surface deposited PM amount detecting device is equal to or larger than a prescribed deposition amount, the bypass state changing device may allow the exhaust gas to flow in the bypass passage so that the exhaust gas is blown to the front end surface of the exhaust gas purification device in the lateral direction of the front end surface.

The prescribed deposition amount may be a threshold value for the front end surface deposited PM amount, at or above which the pressure in the exhaust passage at the portion upstream of the exhaust gas purification device may increase to an excessive value, and an operating state of the internal combustion engine may be influenced by the increase in the pressure.

In a case where the exhaust gas is allowed to flow in the bypass passage, since an amount of the exhaust gas flowing into the turbine of the turbo charger is decreased, a supercharging pressure may decrease. Accordingly, in the case of the aforementioned control, only when the front end surface deposited PM amount is equal to or larger than the prescribed deposition amount, the exhaust gas is allowed to flow in the bypass passage so that the bypass exhaust gas is blown to the front end surface of the exhaust gas purification device. Thus, it is possible to reduce the possibility that the operating state of the internal combustion engine is influenced by deposition of the PM in the front end surface of the exhaust gas purification device, while suppressing a decrease in the supercharging pressure.

According to the invention, the exhaust gas control device may further include bypass flow rate control device for decreasing a flow rate of the exhaust gas flowing in the bypass passage with an increase in the exhaust passage pressure difference detected by the pressure difference detecting device, when the exhaust gas is allowed to flow in the bypass passage.

According to the invention, it is possible to blow off the PM deposited in the front end surface of the exhaust gas purification device using the bypass exhaust gas flowing at a lower flow rate, as the exhaust passage pressure difference becomes larger. Also, as the flow rate of the bypass exhaust gas becomes lower, the flow rate of the exhaust gas supplied to the turbine of the supercharger becomes higher. Thus, influence on the supercharging pressure can be reduced.

Accordingly, since the exhaust gas control apparatus further includes the bypass flow rate control device, it is possible to blow off the PM deposited in the front end surface of the exhaust gas purification device, while suppressing influence on the supercharging pressure.

In the invention, in a case where the exhaust gas control apparatus further includes an EGR device which includes an EGR passage whose one end is connected to an intake passage for an internal combustion engine, and whose other end is connected to the exhaust passage at a portion upstream of the turbine, when the exhaust gas is allowed to flow in the bypass passage in order to blow off the PM deposited in the front end surface of the exhaust gas purification device, if a supercharging pressure is lower than a target supercharging pressure, a flow rate of EGR gas flowing in the EGR passage may be made lower than a flow rate of the EGR gas before the exhaust gas is allowed to flow in the bypass passage.

By performing this control, the flow rate of the exhaust gas flowing into the turbine is increased by decreasing the flow rate of the EGR gas in a case where the supercharging pressure becomes lower than the target supercharging pressure when the exhaust gas is allowed to flow in the bypass passage. Thus, it is possible to suppress an excessive decrease in the supercharging pressure.

The target supercharging pressure may be set based on an engine rotational speed and an engine load of the internal combustion engine.

According to the invention, in a case where the exhaust gas control apparatus further includes a filter which is provided in the exhaust passage at a portion downstream of the exhaust gas purification device, and which has an oxidizing function, a connection passage may be provided such that one end of the connection passage is connected to the exhaust passage at a portion opposite to an opening portion at the second end of the bypass passage, and the other end of the connection passage is connected to the exhaust passage at a portion between the exhaust gas purification device and the filter.

With this configuration, the PM deposited in the front end surface of the exhaust gas control device is blown off by the bypass exhaust gas. Since the one end of the connection passage is connected to the exhaust passage at the portion opposite to the opening portion at the second end of the bypass passage, and the one end of the connection passage is opened, at least part of the PM that has blown off flows into the connection passage. Then, the PM that has flown into the connection passage is discharged to the exhaust passage at the portion between the exhaust gas purification device and the filter, and the PM is oxidized in the filter.

With the exhaust gas control apparatus having the aforementioned configuration, the PM that has been blown off by the bypass exhaust gas can be removed by the exhaust gas purification device and the filter. Accordingly, it is possible to more appropriately remove the PM deposited in the front end surface of the exhaust gas control device.

Further, the bypass state changing device may allow the exhaust gas to flow in the bypass passage for a predetermined period, and may prohibit the exhaust gas from flowing into the bypass passage after the predetermined period elapses.

Thus, since the exhaust gas is allowed to flow in the bypass passage for only the predetermined period, and the exhaust gas is prohibited from flowing in the bypass passage after the predetermined period elapses, it is possible to suppress a decrease in the flow rate of the exhaust gas flowing into the turbine from the exhaust passage. Therefore, it is possible to minimize a decrease in the supercharging pressure.

Thus, according to the aspect of the invention, it is possible to more appropriately remove the PM that is deposited in the front end surface of the exhaust gas control device in the exhaust gas control apparatus for an internal combustion engine, which includes the exhaust gas purification device that is provided in the exhaust passage, and that has the oxidizing ability.

BRIEF DESCRIPTION OF THE DRAWINGS

The above mentioned and other features, advantages, technical and industrial significance of this invention will be better understood by reading the following detailed description of exemplary embodiments of the invention, when considered in connection with the accompanying drawings, in which.

DETAILED DESCRIPTION OF THE EXEMPLARY EMBODIMENTS

In the following description and the accompanying drawings, the present invention will be described in more detail in terms of exemplary embodiments.

Figure 1:
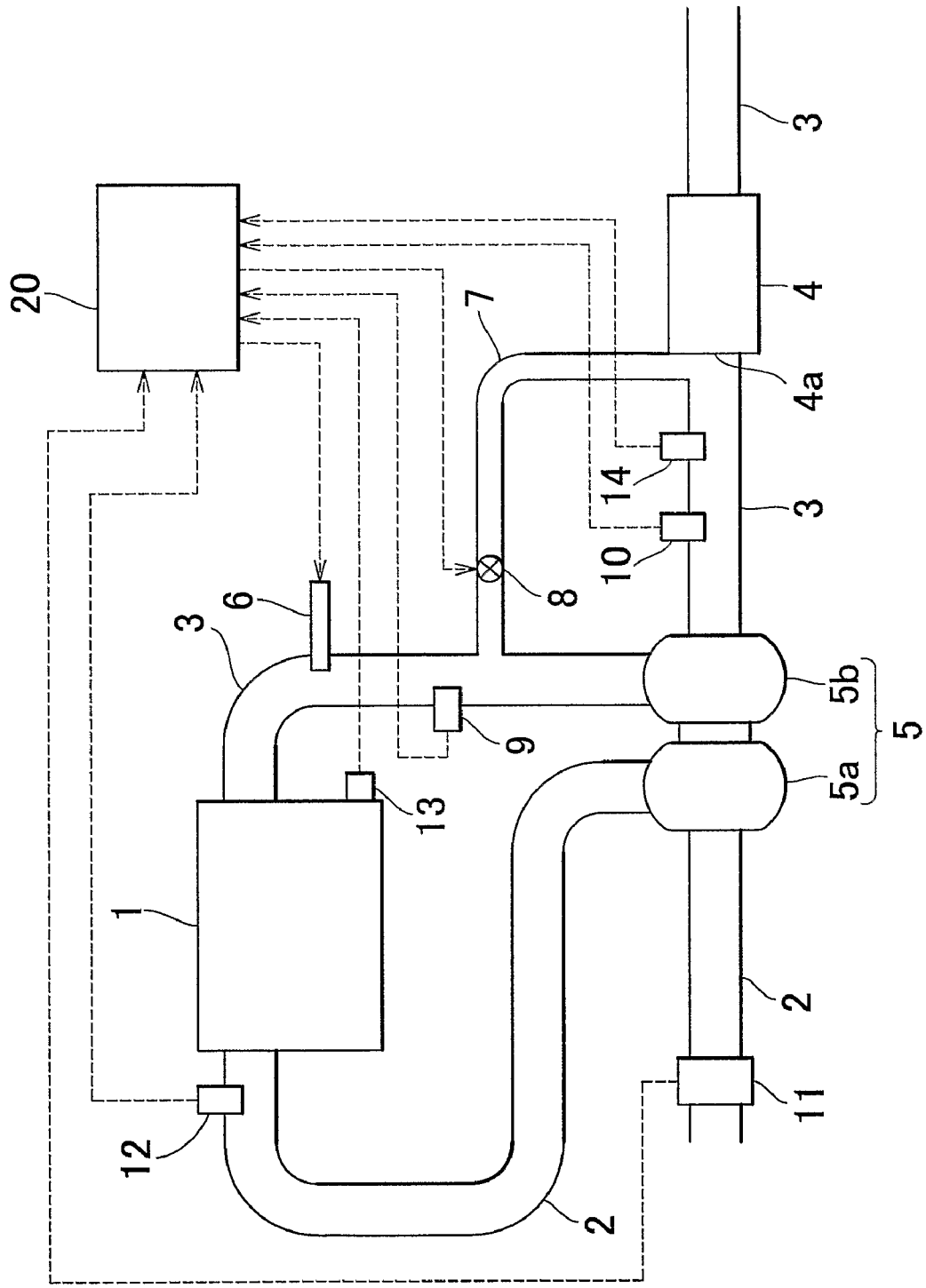
FIG. 1 is a diagram showing an outline of a configuration of an internal combustion engine and intake/exhaust systems thereof according to a first embodiment of the invention.

FIG. 1 is a diagram showing an outline of a configuration of an internal combustion engine and intake/exhaust systems thereof according to a first embodiment of the invention. An intake passage 2 and an exhaust passage 3 are connected to an internal combustion engine 1. In the intake passage 2, an air flow meter 11 is provided. Also, a compressor housing 5a of a turbo charger 5 is provided in the intake passage 2 at a portion downstream of the air flow meter 11. Meanwhile, a turbine housing 5b of the turbo charger 5 is provided in the exhaust passage 3.

A fuel supply valve 6 for supplying fuel to exhaust gas is provided in the exhaust passage 3 at a portion upstream of the turbine housing 5b. Also, a filter 4 supporting an oxidation catalyst is provided in the exhaust passage 3 at a portion downstream of the turbine housing 5b. The filter 4 may be a NOx storage reduction catalyst, or a filter supporting the NOx storage reduction catalyst.

Further, a bypass passage 7 which bypasses the turbine housing 5b is connected to the exhaust passage 3. A first end of the bypass passage 7 is connected to the exhaust passage 3 at a portion which is upstream of the turbine housing 5b and which is downstream of the fuel supply valve 6. Also, a second end of the bypass passage 7 is connected to the exhaust passage 3 at a portion which is downstream of the turbine housing 5b such that an opening portion (opening portion at the second end) is adjacent to a front end surface 4a of the filter 4. Further, the second end of the bypath passage 7 is connected to the exhaust passage 3 such that the bypass passage 7 is substantially orthogonal to the exhaust passage 3. Since the second end of the bypass passage 7 is connected to the exhaust passage 3 in this manner, bypass exhaust gas that has flown in the bypass passage 7 is discharged to the front end surface 4a of the filter 4 in a lateral direction of the front end surface 4a of the filter 4, that is, in a direction parallel with the front end surface 4a.

A bypass exhaust gas control valve 8 is provided in the bypass passage 7. The bypass exhaust gas control valve 8 allows the exhaust gas to flow in the bypass passage 7, and prohibits the exhaust gas from flowing in the bypass passage 7. In a case where the exhaust gas flows in the bypass passage 7, the bypass exhaust gas control valve 8 controls a flow rate of the exhaust gas.

A supercharging pressure sensor 12 is provided in the intake passage 2 at a portion downstream of the compressor housing 5a. The supercharging pressure sensor 12 outputs an electric signal corresponding to a pressure in the intake passage 2. A first exhaust gas pressure sensor 9 is provided in the exhaust passage 3 at a portion upstream of the turbine housing 5b. The first exhaust gas pressure sensor 9 outputs an electric signal corresponding to a pressure in the exhaust passage 3. Also, a second exhaust gas pressure sensor 10 and an exhaust gas temperature sensor 14 are provided in the exhaust passage 3 at a portion which is downstream of the turbine housing 5b, and which is upstream of a connection portion at which the exhaust passage 3 is connected to the second end of the bypass passage 7. The second exhaust gas pressure sensor 10 outputs an electric signal corresponding to the pressure in the exhaust passage 3. The exhaust gas temperature sensor 14 outputs an electric signal corresponding to an exhaust gas temperature in the exhaust passage 3. Further, a crank position sensor 13 is provided in the internal combustion engine 1. The crank position sensor 13 outputs an electric signal corresponding to a crank angle of a crank shaft.

Also, an electronic control unit (ECU) 20 is provided for the internal combustion engine 1. The ECU 20 controls an operating state of the internal combustion engine 1 according to an operating condition for the internal combustion engine 1 and request from a driver. The ECU 20 is connected to various sensors, such as the air flow meter 11, the supercharging pressure sensor 12, the first exhaust gas pressure sensor 9, the second exhaust gas pressure sensor 10, the exhaust gas temperature sensor 14, and the crank position sensor 13, through electric wiring. Output signals from these sensors are input to the ECU 20. Also, the ECU 20 is electrically connected to the fuel supply valve 6, the bypass exhaust gas control valve 8, and the like, which are controlled by the ECU 20.

Next, a PM removal control will be described. In this embodiment, since the PM in the exhaust gas is captured by the filter 4, and is gradually deposited, the PM removal control is performed in order to remove the PM from the filter 4, before an amount of the PM deposited in the filter 4 increases to an excessive value.

In the PM removal control, when the oxidation catalyst supported by the filter 4 is active, fuel is supplied from the fuel supply valve 6. Then, a temperature of the filter 4 is increased using heat of oxidation, which is generated by oxidizing the supplied fuel in the oxidation catalyst. Thus, the deposited PM is oxidized and removed.

However, even when this PM removal control is performed, since the temperature is unlikely to increase in the front end surface 4a of the filter 4, the PM deposited in the front end surface 4a may not be removed. Further, part of the fuel supplied from the fuel supply valve 6 may adhere to the front end surface 4a of the filter 4. In this case, since the fuel adhering to the front end surface 4a of the filter 4 and the PM in the exhaust gas are mixed together, the PM may become more likely to be deposited in the front end surface 4a of the filter 4. Hereinafter, the PM deposited in the front end surface 4a of the filter 4 will be referred to as "front end surface deposited PM".

When the amount of the front end surface deposited PM increases to an excessive value, the pressure in the exhaust passage 3 at a portion upstream of the filter 4 may increase to an excessive value, which may influence the operating state of the internal combustion engine 1.

Next, a filter front end surface deposited PM removal control will be described. In this embodiment, the filter front end surface deposited PM removal control routine for removing the front end surface deposited PM is performed. Hereinafter, description will be made of the filter front end surface deposited PM removal control routine according to this embodiment, with reference to a flowchart shown in FIG. 2. This routine is performed at prescribed time intervals while the internal combustion engine 1 is operated.

In this routine, first, in step S101, the ECU 20 calculates a pressure difference $\Delta P$ in the exhaust passage 3 (hereinafter, referred to as "exhaust passage pressure difference $\Delta P$") by subtracting a value detected by the second exhaust gas pressure sensor 10 from a value detected by the first exhaust gas pressure sensor 9. The ECU 20 may calculate the exhaust passage pressure difference $\Delta P$ based on an engine load and an engine rotational speed of the internal combustion engine 1.

Next, in step S102, the ECU 20 determines whether the exhaust passage pressure difference $\Delta P$ is equal to or greater than a prescribed pressure difference $\Delta P0$. When an affirmative determination is made in step S102, the ECU 20 performs step S103. When a negative determination is made in step S102, the ECU 20 finishes the routine.

In step S103, the ECU 20 opens the bypass exhaust gas control valve 8. When the bypass exhaust control valve 8 is opened, part of the exhaust gas flows into the bypass passage 7 since the exhaust passage pressure difference $\Delta P$ is equal to or greater than the prescribed pressure difference $\Delta P0$. Then, the exhaust gas (bypass exhaust gas) that has flown into the bypass passage 7 is ejected from the opening portion at the second end of the bypass passage 7.

Next, in step S104, the ECU 20 determines whether a prescribed period has elapsed since the bypass exhaust gas control valve 8 is opened. When an affirmative determination is made in step S104, the ECU 20 performs step S105. When a negative determination is made in step S104, the ECU 20 repeatedly performs step S104.

In step S105, the ECU 20 closes the bypass exhaust gas control valve 8, and then finishes the routine.

In this embodiment, the opening portion at the second end of the bypass passage 7 is adjacent to the front end surface 4a of the filter 4, and the second end of the bypass passage 7 is connected to the exhaust passage 3 such that the bypass passage 7 is substantially orthogonal to the exhaust passage 3. Therefore, in the aforementioned routine, the exhaust gas is allowed to flow into the bypass passage 7 by opening the bypass exhaust gas control valve 8, the bypass exhaust gas is ejected from the opening portion at the second end of the bypass passage 7, and thus the bypass exhaust gas is blown to the front end surface 4a of the filter 4 in the lateral direction of the front end surface 4a of the filter 4, that is, in the direction substantially parallel with the front end surface 4a.

Accordingly, in the embodiment, the front end surface deposited PM can be blown off using the bypass exhaust gas. The PM that has been blown off using the bypass exhaust gas flows into the filter 4 together with the exhaust gas that flows in the exhaust gas passage 3 and then flows into the filter 4. Then, the PM is oxidized and removed by the oxidation catalyst. Thus, it is possible to more appropriately remove the front end surface deposited PM.

In the filter front end surface deposited PM removal control routine, the prescribed pressure difference $\Delta P0$ is a pressure difference which makes it possible to blow off the front end surface deposited PM using the bypass exhaust gas. The prescribed pressure difference $\Delta P0$ is set in advance through experience or the like.

Also, the prescribed period t is set in advance. Also, the prescribed period t is set such that the front end surface deposited PM is blown off and the amount of the front end surface deposited PM is sufficiently reduced by blowing the bypass exhaust gas to the front end surface 4a of the filter 4 for the prescribed period t.

In this embodiment, when the bypass exhaust gas control valve 8 is opened, part of the exhaust gas flowing in the portion upstream of the turbine housing 5b in the exhaust passage 3 flows into the bypass passage 7, a flow rate of the exhaust gas used for driving the turbo charger 5 is reduced. As a result, the supercharging pressure may decrease.

Accordingly, in this embodiment, the bypass exhaust gas control valve 8 may be opened when the exhaust gas passage pressure difference $\Delta P$ is equal to or greater than the prescribed pressure difference $\Delta P0$, and the pressure detected by the first exhaust gas pressure sensor 9, that is, the pressure in the exhaust gas passage 3 at the portion upstream of the turbine housing 5b is equal to or higher than a prescribed pressure.

The prescribed pressure is set to a value at or above which the exhaust gas for driving the turbo charger 5 flows at a sufficient flow rate even when the bypass exhaust gas control valve 8 is opened and part of the exhaust gas flows into the bypass passage 7.

By performing this control, it is possible to suppress an excessive decrease in the supercharging pressure.

Also, in this embodiment, the bypass exhaust gas control valve 8 may be opened when the supercharging pressure detected by the supercharging pressure sensor 12 is excessively high. By performing this control, the bypass exhaust gas control valve 8 can function as a waste gate valve.

Hereinafter a second embodiment of the invention will be described. Since the outline of the configuration of the internal combustion engine and the intake/exhaust systems thereof according to the second embodiment is the same as that in the first embodiment, description thereof will be omitted.

Figure 2:
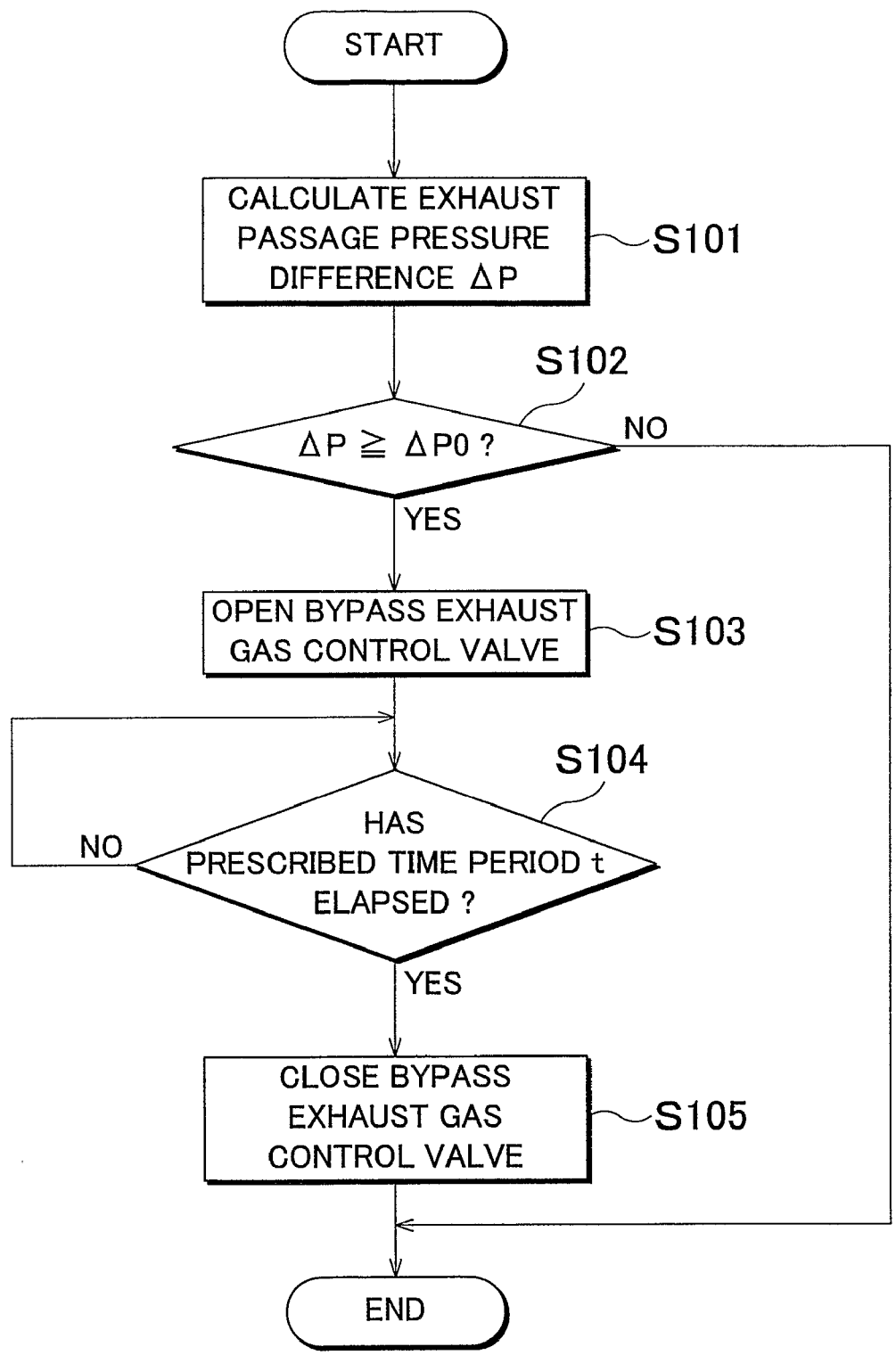
FIG. 2 is a flowchart showing a filter front end surface deposited PM removal control routine according to the first embodiment of the invention.

Next, a filter front end surface deposited PM removal control according to the second embodiment will be described. Description will be made of the filter front end surface deposited PM removal control routine, with reference to a flowchart shown in FIG. 3. In this routine, steps that are the same as those in the aforementioned filter front end surface deposited PM removal control routine shown in FIG. 2 are denoted by the same reference numerals, and description thereof will be omitted. This routine is performed at prescribed time intervals while the internal combustion engine 1 is operated, as well as the routine shown in FIG. 2.

In this routine, first, in step S201, the ECU 20 reads a front end surface deposited PM amount SQ_PMINC that is calculated by a front end surface deposited PM amount calculation routine that will be described later.

Next, in step S202, the ECU 20 determines whether the front end surface deposited PM amount SQ_PMINC that is read in step S201 is equal to or larger than a prescribed deposition amount Q0. When an affirmative determination is made in step S202, the ECU 20 performs step S101. When a negative determination is made, the ECU 20 finishes the routine.

The prescribed deposition amount Q0 is a threshold value for the amount of the front end surface deposited PM, at or above which the pressure in the exhaust passage 3 at the portion upstream of the filter 4 may increase to an excessive value, and the operating state of the internal combustion engine 1 may be influenced by the increase in the pressure.

In the control routine that has been described, the exhaust gas is allowed to flow in the bypass passage 7 only when the front end surface deposited PM amount SQ_PMINC is equal to or larger than the prescribed deposition amount Q0. Therefore, it is possible to reduce the possibility that the operating state of the internal combustion engine 1 is influenced by deposition of the PM in the front end surface 4a of the filter 4, while suppressing a decrease in the supercharging pressure.

Figure 3:
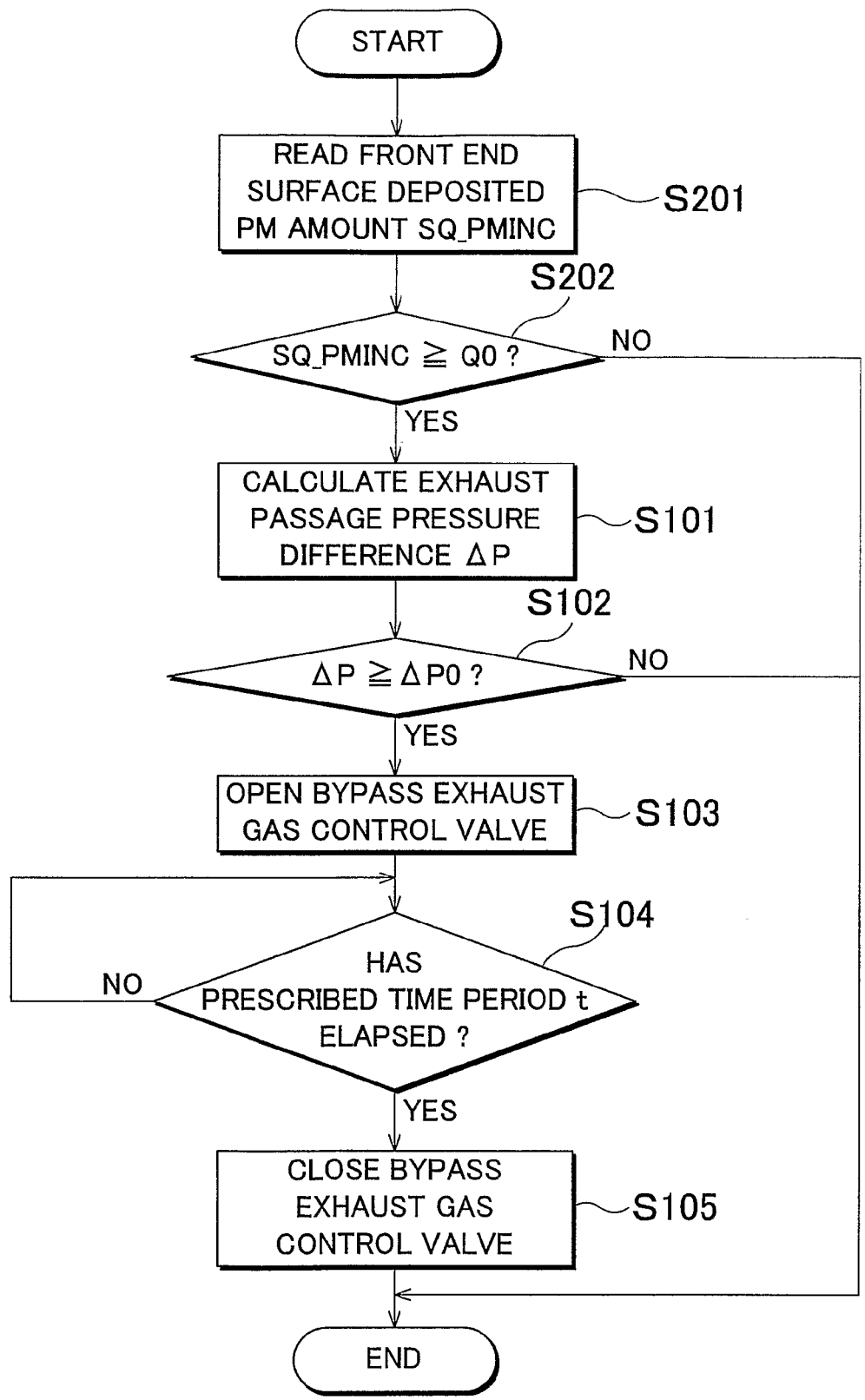
FIG. 3 is a flowchart showing a filter front end surface deposited PM removal control routine according to a second embodiment of the invention.
Figure 4:
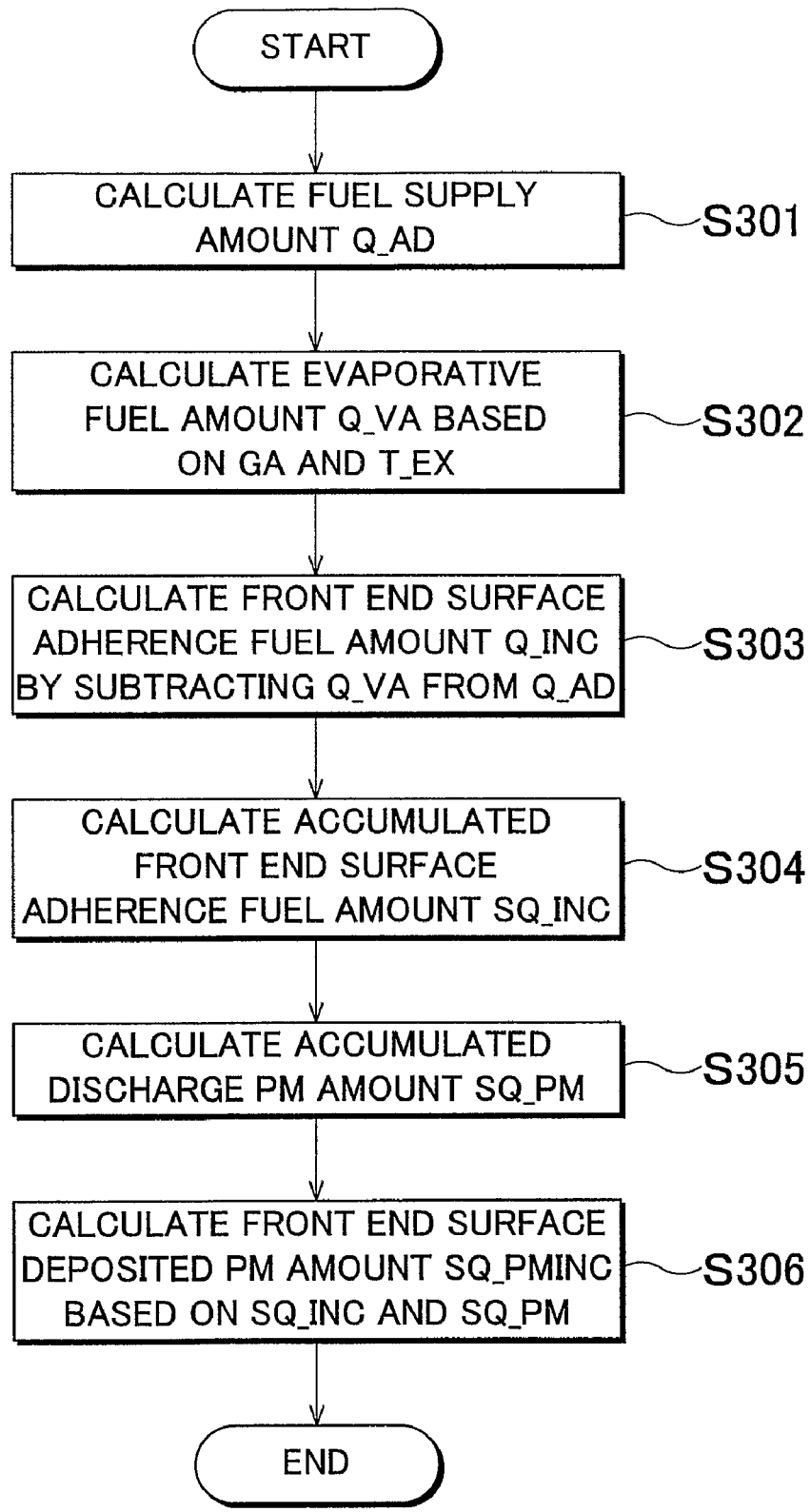
FIG. 4 is a flowchart showing a front end surface deposited PM amount calculation routine according to a second embodiment of the invention.

Next, description will be made of the front end surface deposited PM amount calculation routine for calculating the amount of the front end surface deposited PM, with reference to a flowchart shown in FIG. 4. This routine is performed at prescribed time intervals while the internal combustion engine 1 is operated, as well as the routines shown in FIG. 2 and FIG. 3.

In this routine, first, in step S301, the ECU 20 calculates a fuel supply amount Q_AD, which is an amount of fuel that is supplied from the fuel supply valve 6 while the PM removal control is performed.

Next, in step S302, the ECU 20 calculates an evaporative fuel amount Q_VA, which is an amount of evaporated fuel in the entire fuel supplied from the fuel supply valve 6, based on an intake air flow rate GA detected by the air flow meter 11, and an exhaust gas temperature T_EX detected by the exhaust gas temperature sensor 14. A relationship between the intake air flow rate GA and the exhaust gas temperature T_EX, and the evaporative fuel amount Q_VA is obtained through experiment or the like, and the relationship is stored in a form of a map in advance. The evaporative fuel amount Q_VA is calculated using the map. In this map, the evaporative fuel amount Q_VA is increased with an increase in the intake air flow rate GA, and the evaporative fuel amount Q_VA is increased with an increase in the exhaust gas temperature T_EX.

Fuel which is not evaporated in the fuel that is injected from the fuel supply valve 6 adheres to the front end surface 4a of the filter 4. Accordingly, after step S302 is performed, the ECU 20 calculates a front end surface adherence fuel amount Q_INC, which is an amount of the fuel adhering to the front end surface 4a of the filter 4, by subtracting the evaporative fuel amount Q_VA from the fuel supply amount Q_AD in step S303.

Next, in step S304, the ECU 20 calculates an accumulated front end surface adherence fuel amount SQ_INC which is an accumulated value obtained by accumulating the front end surface adherence fuel amounts Q_INC.

Next, in step S305, the ECU 20 calculates an accumulated discharge PM amount SQ_PM, which is an accumulated value obtained by accumulating amounts of PM discharged from the internal combustion engine 1, based on the engine rotational speed of the internal combustion engine 1 and the amount of fuel injected in the internal combustion engine 1.

Next, in step S306, the ECU 20 calculates the front end surface deposited PM amount SQ_PMINC based on the accumulated front end surface adherence fuel amount SQ_INC and the accumulated discharge PM amount SQ_PM. A function used for calculating the front end surface deposited PM amount SQ_PMINC based on the accumulated front end surface adherence SQ_INC and the accumulated discharge PM amount SQ_PM may be obtained through experiment or the like, and the accumulated front end surface adherence SQ_INC may be calculated using the function. Also, a map showing a relationship between the accumulated front end surface adherence fuel amount SQ_INC and the accumulated discharge PM amount SQ_PM, and the front end surface deposited PM amount SQ_PMINC may be stored in advance, and the front end surface deposited PM amount SQ_PMINC may be calculated using this map.

By performing the calculation routine that has been described, the front end surface deposited PM amount SQ_PMINC can be calculated.

In the front end surface deposited PM amount calculation routine that has been described, the evaporative fuel amount Q_VA that is calculated in step S302 may be corrected based on evaporativity of the fuel injected from the fuel supply valve 6. That is, the evaporative fuel amount Q_VA may be corrected so as to be increased with an increase in the evaporativity of the supplied fuel. Examples of the method of correcting the evaporative fuel amount Q_VA based on the evaporativity of the fuel include a method in which an end boiling point which is correlated with the evaporativity of the fuel is stored in the ECU 20 when the fuel is supplied to a fuel tank, a correction coefficient for the evaporative fuel amount Q_VA is set based on the end boiling point of the fuel, and the evaporative fuel amount Q_VA is corrected using the correction coefficient.

By correcting the evaporative fuel amount Q_VA in this manner, it is possible to calculate the front end surface deposited PM amount SQ_PMINC with high accuracy.

Next, a third embodiment of the invention will be described. Since the outline of the configuration of the internal combustion engine and the intake/exhaust systems thereof according to the third embodiment is the same as that in the first embodiment, description thereof will be omitted.

Figure 5:
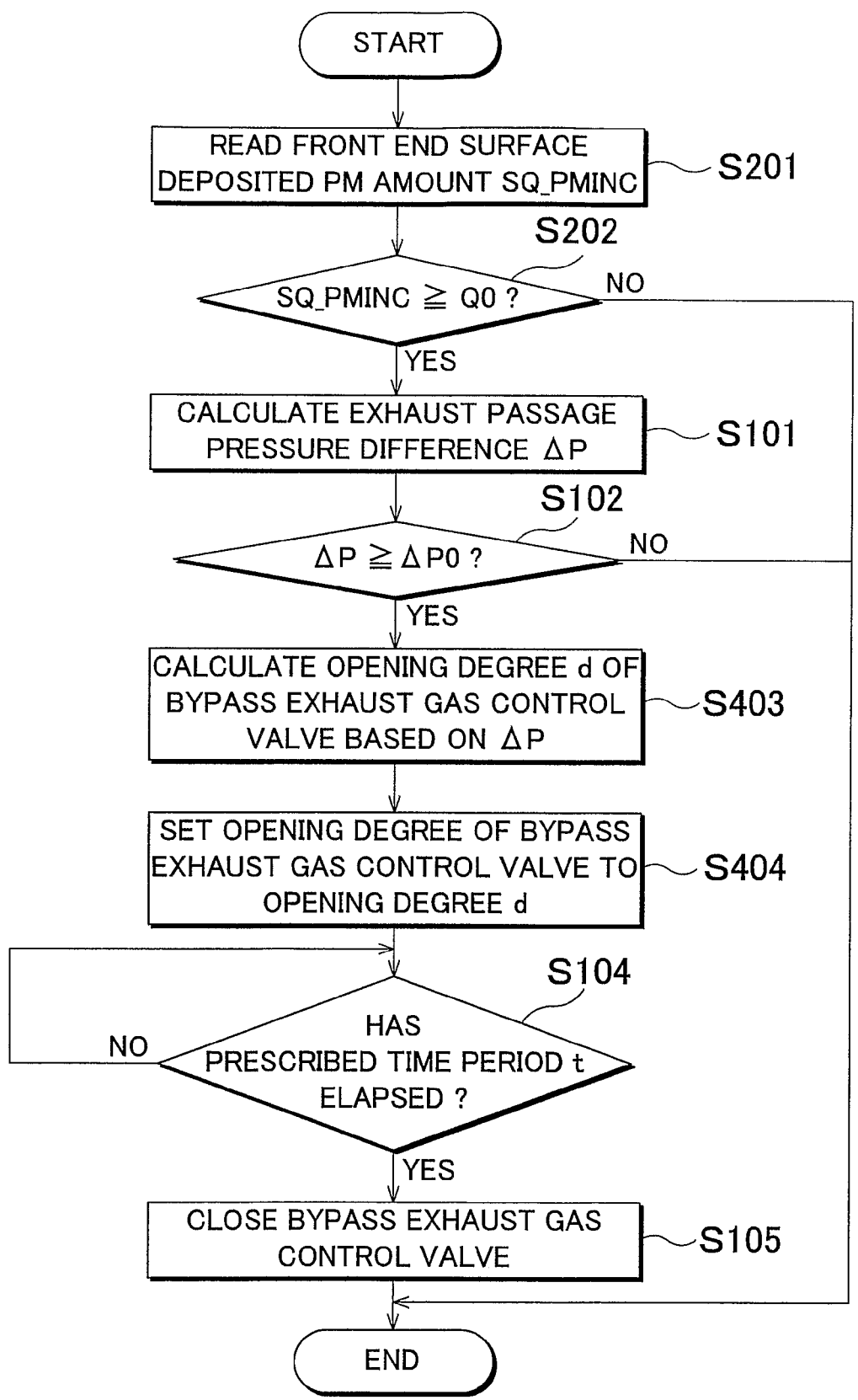
FIG. 5 is a flowchart showing a filter front end surface deposited PM removal control routine according to a third embodiment of the invention.

A filter front end surface deposited PM removal control according to the third embodiment will be described. Description will be made of the filter front end surface deposited PM removal control according to the third embodiment, with reference to a flowchart shown in FIG. 5. In this routine, steps that are the same as those in the aforementioned filter front end surface deposited PM removal control routine shown in FIG. 3 are denoted by the same reference numerals, and description thereof will be omitted. This routine is performed at prescribed time intervals while the internal combustion engine 1 is operated, as well as the routine shown in FIG. 3.

In this routine, when an affirmative determination is made in step S102, the ECU 20 performs step S403.

In step S403, the ECU 20 calculates an opening degree "d" of the bypass exhaust gas control valve 8 at a time when the bypass exhaust gas control valve 8 is opened in order to blow off the PM deposited in the front end surface 4a of the filter 4, based on the exhaust passage pressure difference ΔP. As the exhaust passage pressure difference ΔP becomes larger, the PM deposited in the front end surface 4a of the filter 4 can be blown off using the bypass exhaust gas flowing at a lower flow rate. Therefore, as the exhaust passage pressure difference ΔP becomes larger, the opening degree "d" of the bypass exhaust gas control valve 8 is set to a smaller value. A relationship between the exhaust passage pressure difference ΔP and the opening degree "d" of the bypass exhaust gas control valve 8 may be obtained in advance through experiment or the like, the relationship may be stored in advance in the form of a map, and the opening degree "d" of the bypass exhaust gas control valve 8 may be calculated using this map.

Next, in step S404, the ECU 20 opens the bypass exhaust gas control valve 8, and sets the opening degree of the bypass exhaust gas control valve 8 to the opening degree "d". Then, the ECU 20 performs step S104.

In this embodiment, the PM deposited in the front end surface 4a of the filter 4 can be blown off using the exhaust gas flowing at the lowest possible flow rate. As a result, it is possible to blow off the PM deposited in the front end surface 4a of the filter 4 while suppressing a decrease in the supercharging pressure provided by the turbo charger 5.

Figure 6:
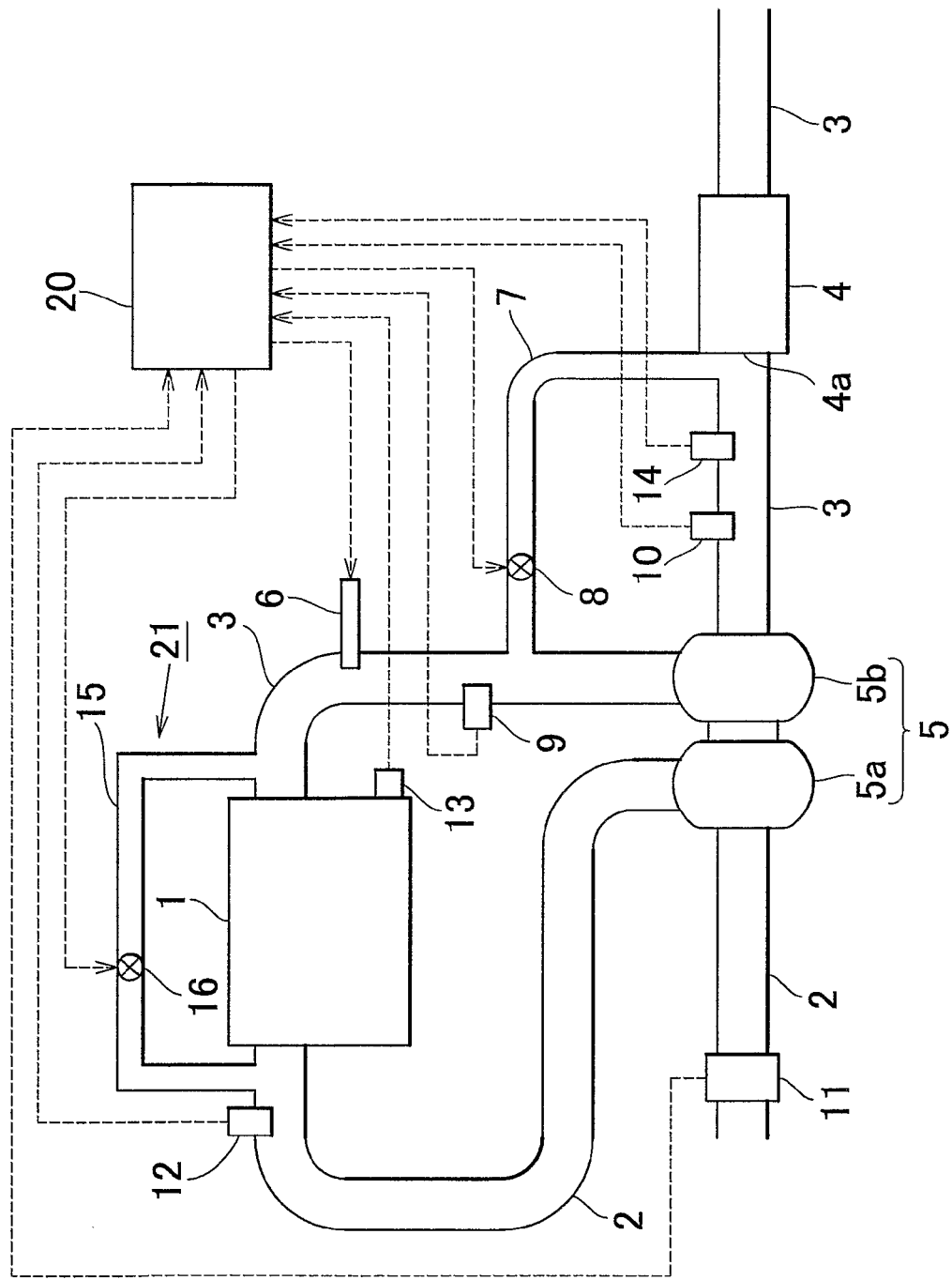
FIG. 6 is a diagram showing an outline of a configuration of an internal combustion engine, and intake/exhaust systems thereof according to a fourth embodiment of the invention.

Further, a fourth embodiment of the invention will be described. FIG. 6 is a diagram showing an outline of a configuration of an internal combustion engine, and intake/exhaust systems thereof according to a fourth embodiment of the invention. In FIG. 6, portions that are the same as those in the configuration of the internal combustion engine and the intake/exhaust systems thereof shown in FIG. 1 are denoted by the same reference numerals, and description thereof will be omitted.

In this embodiment, the internal combustion engine 1 includes an EGR device 21. The EGR device 21 includes an EGR passage 15 whose one end is connected to the intake passage 2, and whose other end is connected to the exhaust passage 3 at a portion upstream of the turbine housing 5b of the turbo charger 5; and an EGR valve 16 which is provided in the EGR passage 15, and which controls a flow rate of EGR gas which flows in the EGR passage 15.

Figure 7:
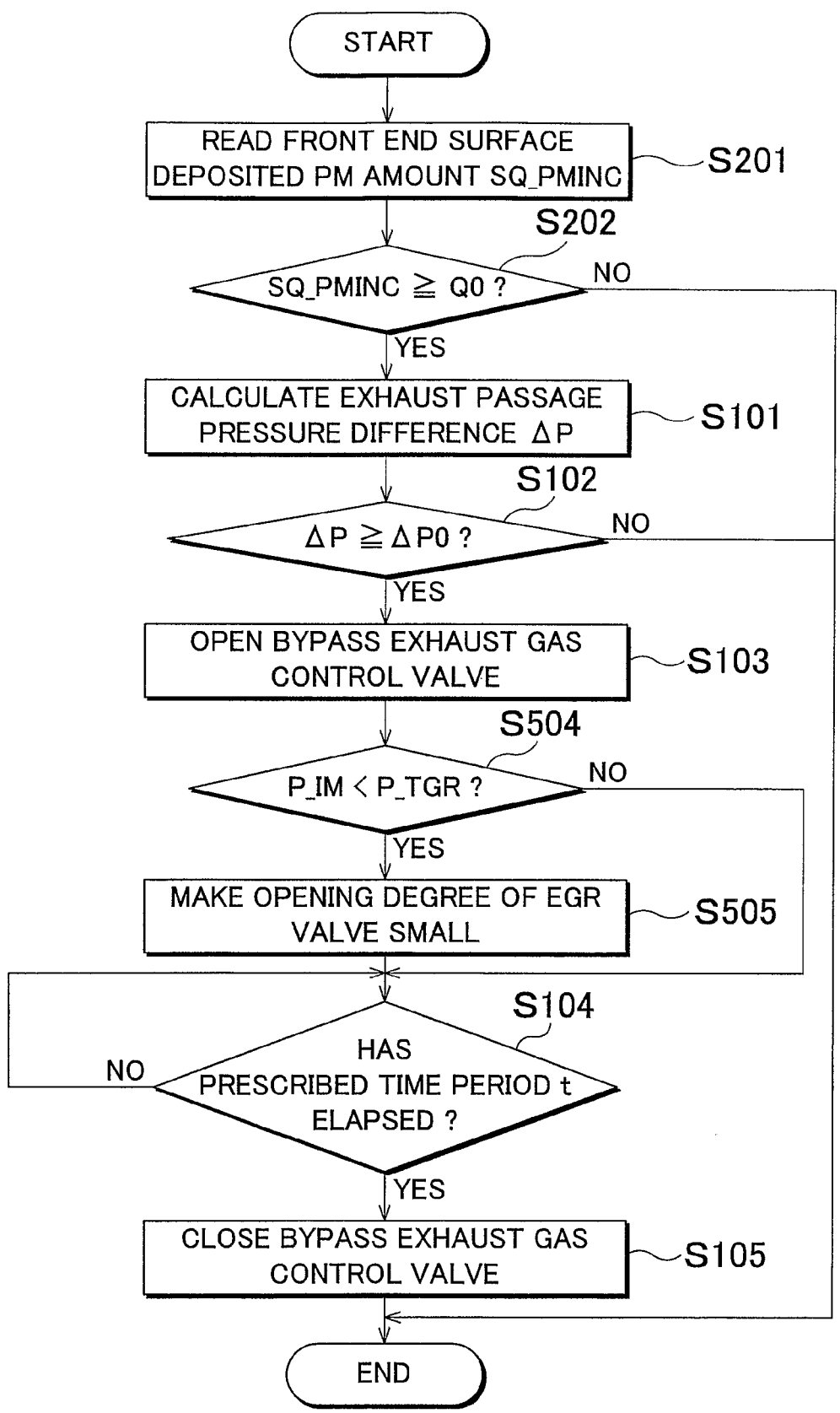
FIG. 7 is a flowchart showing a filter front end surface deposited PM removal control routine according to the fourth embodiment of the invention.

Hereinafter, description will be made of a filter front end surface deposited PM removal control routine according to the fourth embodiment, with reference to a flowchart shown in FIG. 7. In this routine, steps that are the same as those in the aforementioned filter front end surface deposited PM removal control routine shown in FIG. 3 are denoted by the same reference numerals, and description thereof will be omitted. This routine is performed at prescribed time intervals while the internal combustion engine 1 is operated, as well as the routine shown in FIG. 3.

In this routine, after the bypass exhaust gas control valve 8 is closed in step S103, the ECU 20 performs step S504.

In step S504, the ECU 20 determines whether a supercharging pressure P_IM is lower than a target supercharging pressure P_TGR. The target supercharging pressure P_TGR is set based on the engine rotational speed and the engine load of the internal combustion engine 1. When an affirmative determination is made in step S504, the ECU 20 performs step S505. When a negative determination is made in step S504, the ECU 20 performs step S104.

In step S505, the ECU 20 decreases the flow rate of EGR gas by setting the opening degree of the EGR valve 16 to a value smaller than the opening degree of the EGR valve 16 before the bypass exhaust gas control valve 8 is opened. Then, the ECU 20 performs step S104.

In this embodiment, when the supercharging pressure is decreased to be lower than the target supercharging pressure P_TGR by allowing the exhaust gas to flow into the bypass passage 7, the flow rate of the EGR gas is decreased. As a result, the flow rate of the exhaust gas flowing into the turbine housing 5b is increased. Therefore, it is possible to suppress an excessive decrease in the supercharging pressure.

Figure 8:
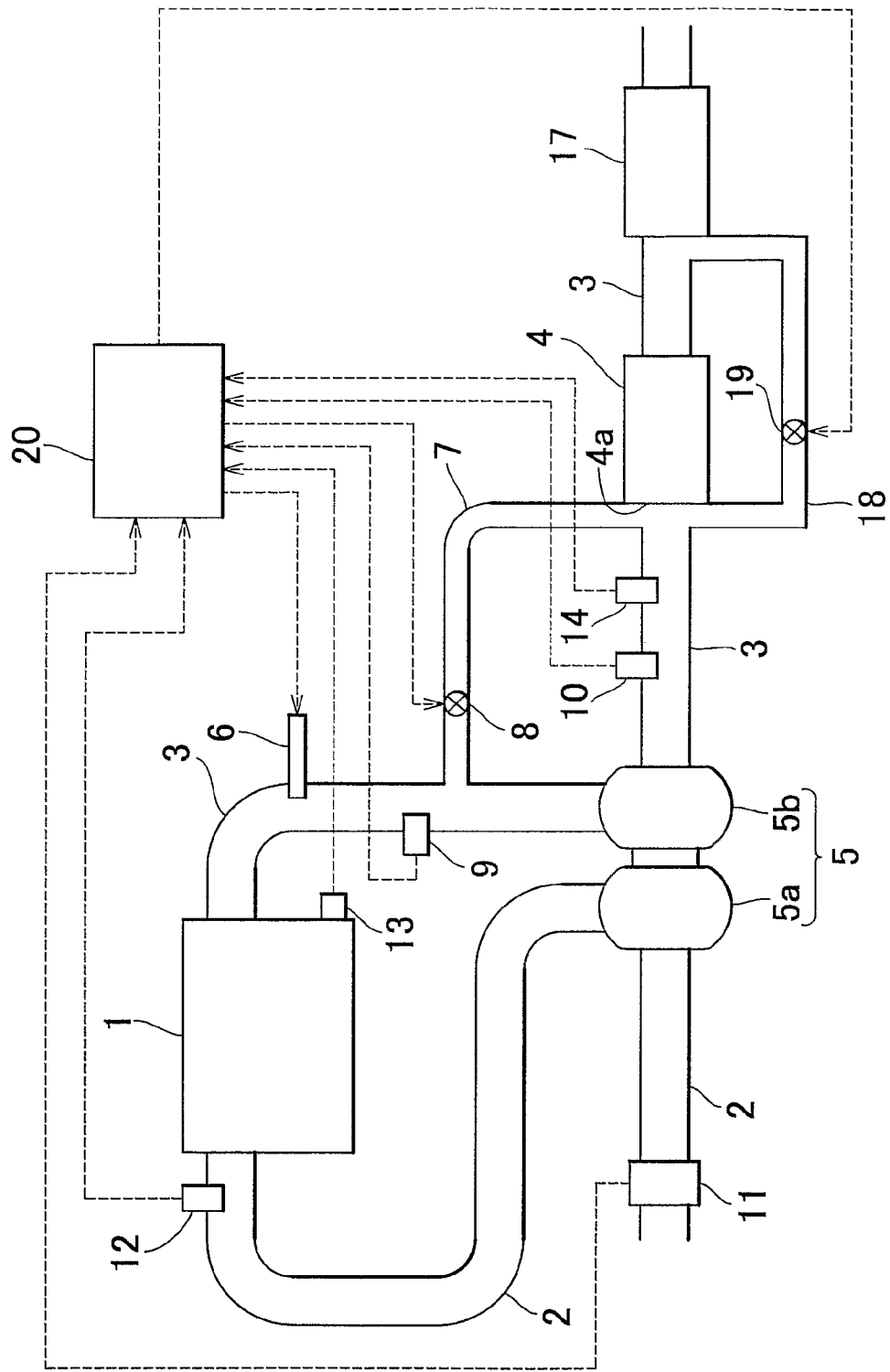
FIG. 8 is a diagram showing an outline of a configuration of an internal combustion engine, and intake/exhaust systems thereof according to a fifth embodiment of the invention.

Next, a fifth embodiment of the invention will be described. FIG. 8 is a diagram showing an outline of a configuration of an internal combustion engine and intake/exhaust systems thereof according to a fifth embodiment of the invention. In FIG. 8, portions that are the same as those in the configuration of the internal combustion engine and the intake/exhaust systems thereof shown in FIG. 1 are denoted by the same reference numerals, and description thereof will be omitted.

In this embodiment, a filter 17 is additionally provided at a portion downstream of the filter 4 in the exhaust passage 3. The filter 17 supports a NOx storage reduction catalyst. The filter 17 may be a filter which supports an oxidation catalyst.

A connection passage 18 is connected to the exhaust passage 3. One end of the connection passage 18 is connected to the exhaust passage 3 at a portion opposite to the opening portion at the second end of the bypass passage 7, and the other end of the connection passage 18 is connected to the exhaust passage 3 at a portion between the filter 4 and the filter 17. A connection passage valve 19 is provided in the connection passage 18. The connection passage valve 19 opens and closes the connection passage 18. The connection passage valve 19 is electrically connected to the ECU 20, and opening/closing of the connection passage valve 19 is controlled by the ECU 20.

When the ECU 20 opens the bypass exhaust gas control valve 8 in order to blow off the front end surface deposited PM, the ECU 20 also opens the connection passage valve 19.

In the configuration and control that have been described, at least part of the PM that has been blown off by the bypass exhaust gas flows into the connection 18 from the one end of the connection passage 18, which is positioned at the portion opposite to the opening portion at the second end of the bypass passage 7. Then, the PM that has flown into the connection passage 18 is discharged to the exhaust passage 3 at the portion between the filter 4 and the filter 17. Then, the PM flows into the filter 17, and is oxidized by the filter 17.

Thus, according to this embodiment, the PM that has been blown off by the bypass exhaust gas can be removed by the filter 4 and the filter 17. Accordingly, it is possible to more appropriately remove the PM deposited in the front end surface 4a of the filter 4.

The invention claimed is:

1. An exhaust gas control apparatus for an internal combustion engine, comprising:
    a supercharger whose turbine is provided in an exhaust passage for an internal combustion engine;
    an exhaust gas purification device which is provided in the exhaust passage at a portion downstream of the turbine, and which has an oxidizing function;
    an unburned fuel component supply device that supplies an unburned fuel component to the exhaust passage at a portion upstream of the exhaust gas purification device so that the unburned fuel component is supplied to the exhaust gas purification device when a prescribed condition is satisfied;
    a bypass passage whose first end is connected to the exhaust passage at a portion upstream of the turbine such that exhaust gas which has flown into the bypass passage through the first end flows so as to bypass the supercharger, and whose second end is connected to the exhaust passage at a portion close to a front end surface of the exhaust gas purification device such that the exhaust gas that has flown in the bypass passage is discharged toward the front end surface (4a) of the exhaust gas purification device in a lateral direction of the front end surface;
    a bypass state changing device for allowing the exhaust gas to flow in the bypass passage, and prohibiting the exhaust gas from flowing into the bypass passage; and
    a pressure difference detecting device for detecting a pressure difference between a pressure in the exhaust passage at a portion upstream of the turbine, and a pressure in the exhaust passage at a portion which is downstream of the turbine, and which is upstream of the exhaust gas purification device, wherein when the pressure difference detected by the pressure difference detecting device is equal to or greater than a prescribed pressure difference, the bypass passage state changing device allows the exhaust gas to flow in the bypass passage so that the exhaust gas is blown to the front end surface of the exhaust gas purification device in the lateral direction of the front end surface.

2. The exhaust gas control apparatus for an internal combustion engine according to claim 1, wherein an opening portion at the second end of the bypass passage is adjacent to the front end surface of the exhaust gas purification device, and the second end of the bypass passage is connected to the exhaust passage such that the bypass passage is substantially orthogonal to the exhaust passage.

3. The exhaust gas control apparatus for an internal combustion engine according to claim 1, further comprising:
    front end surface deposited PM amount detecting device for detecting a front end surface deposited PM amount that is an amount of particulate matter deposited in the front end surface of the exhaust gas purification means device, wherein when the front end surface deposited PM amount detected by the front end surface deposited PM amount detecting device is equal to or larger than a prescribed deposition amount, the bypass state changing device allows the exhaust gas to flow in the bypass passage so that the exhaust gas is blown to the front end surface of the exhaust gas purification device in the lateral direction of the front end surface.

4. The exhaust gas control apparatus for an internal combustion engine according to claim 1, further comprising:
    bypass flow rate control device for decreasing a flow rate of the exhaust gas flowing in the bypass passage with an increase in the pressure difference detected by the pressure difference detecting device, when the exhaust gas is allowed to flow in the bypass passage.

5. The exhaust gas control apparatus for an internal combustion engine according to claim 1, further comprising:
    an EGR device which includes an EGR passage whose one end is connected to an intake passage for an internal combustion engine, and whose other end is connected to the exhaust passage at a portion upstream of the turbine, wherein when the exhaust gas is allowed to flow in the bypass passage, if a supercharging pressure is lower than a target supercharging pressure, a flow rate of EGR gas flowing in the EGR passage is made lower than a flow rate of the EGR gas before the exhaust gas is allowed to flow in the bypass passage.

6. The exhaust gas control apparatus for an internal combustion engine according to claim 1, further comprising:
a particulate filter which is provided in the exhaust passage at a portion downstream of the exhaust gas purification device, and which has an oxidizing function and captures particulate matter in the exhaust gas; and
a connection passage whose one end is connected to the exhaust passage at a portion opposite to an opening portion at the second end of the bypass passage, and whose other end is connected to the exhaust passage at a portion between the exhaust gas purification device and the particulate filter.

7. The exhaust gas control apparatus for an internal combustion engine according to claim 1, wherein the bypass state changing device allows the exhaust gas to flow in the bypass passage for a predetermined period, and prohibits the exhaust gas from flowing into the bypass passage after the predetermined period elapses.

* * * * *